March 13, 1962   J. F. SNOW   3,025,087
SEALING STRUCTURE
Filed June 24, 1958
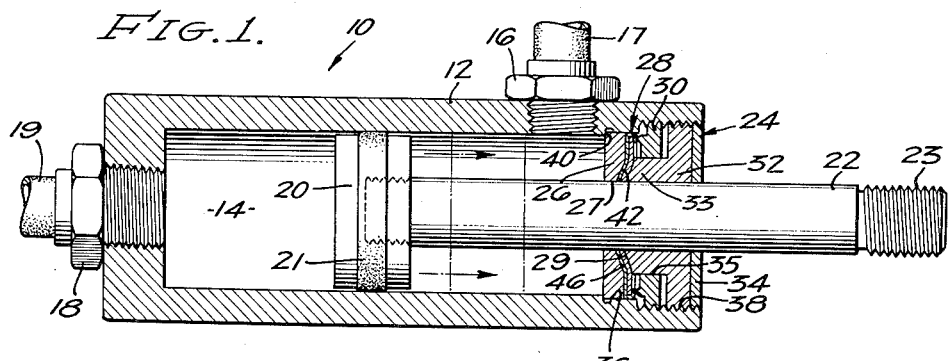
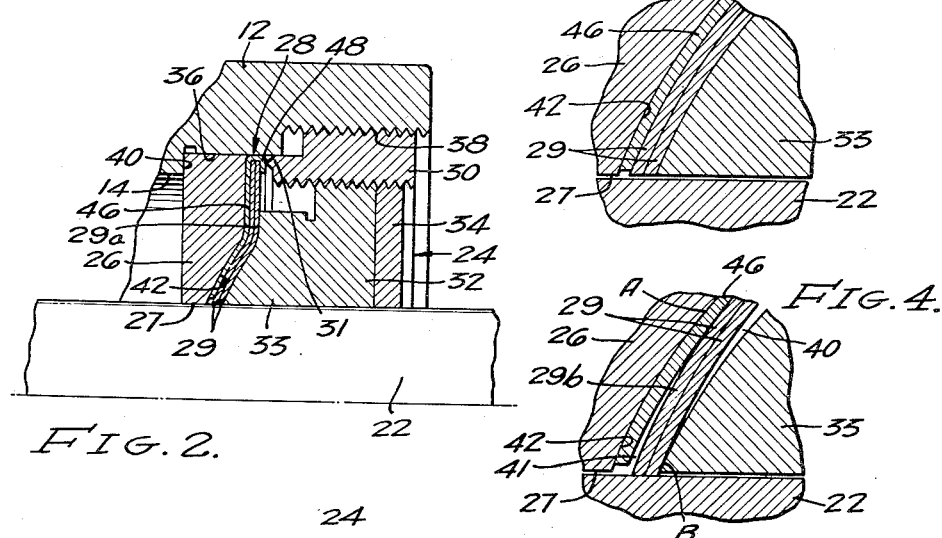
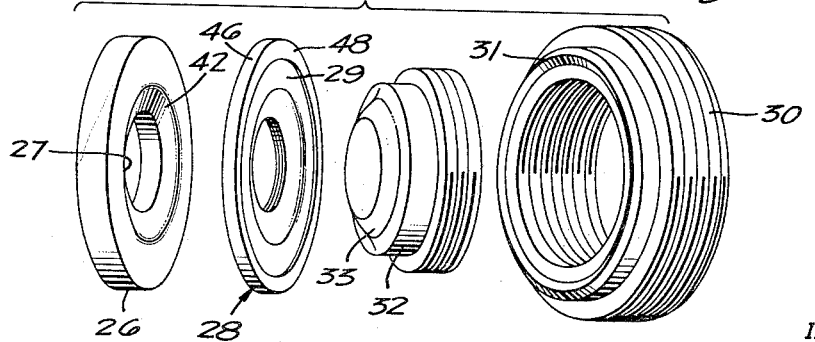
INVENTOR.
JAMES F. SNOW
BY Reed & Lawlor
ATTORNEY

United States Patent Office 3,025,087
Patented Mar. 13, 1962

3,025,087
SEALING STRUCTURE
James F. Snow, 5655 Cedros, Van Nuys, Calif.
Filed June 24, 1958, Ser. No. 744,270
1 Claim. (Cl. 277—112)

This invention relates generally to glandular seals or sealing structures and is particularly applicable to fluid type actuators and the like.

The proper sealing of mechanisms that employ fluid has always been a particularly serious problem where such mechanisms employ a fluid that is flammable or is otherwise active especially where such mechanisms are used in confined spaces. These problems are particularly serious wherever a shaft passes through a wall into a cavity containing fluid under high pressure. In centrifugal pumps, for example, used in chemical plants, even a small leak may result in a fire. In servo-mechanisms that employ fluid actuated piston-and-cylinder units, a leak in one of the units may result in complete failure of the system that is being controlled. While various forms of seals utilizing many different materials have been used in the past, all of them have proven ineffective, more or less, under conditions of usage where extreme temperatures and elevated pressures have been encountered even if only for short periods of time. The viscosity of such activating fluids is generally decreased with increase of temperature. For this reason, the leakage problem is most serious at elevated temperatures. However, the problem is also very serious where low boiling point liquids are employed at low operating temperatures, as where the mechanism is employed to control a liquid oxygen supply. Even at low temperatures, such as those attained by liquid oxygen, the pressures of the actuating fluid may become ineffective or they may even freeze to the actuating rods or other members.

The principal object of my invention, therefore, is to provide a sealing structure that automatically becomes more effective when subjected to a change from ambient temperature to operating temperature.

Another object of my invention is to provide a sealing structure that automatically becomes more effective when subjected to a change from an ambient pressure to an operating pressure.

Another object of my invention is to provide a seal between a cavity wall and a shaft that passes through that wall, that becomes more effective as the temperature changes or the pressure increases, but without preventing relative movement between the wall and the shaft.

Another object of my invention is to provide a sealing structure that is relatively easy to manufacture and install.

A further object of my invention is to provide a sealing structure that will function effectively over a range of temperatures to either extremely high temperatures, as may be experienced on the skin or wings of a jet aircraft traveling at supersonic speeds, or else to extremely low temperatures, as experienced in the liquid oxygen apparatus employed on missiles or other liquid fuel rocket propelled vehicles.

Other and further objects and advantages of my invention will be described in the following specification and drawings wherein like reference characters denoting like parts are used throughout the several views, and wherein:

FIGURE 1 is a cross-sectional view of one embodiment of my invention;

FIGURE 2 is an enlarged cross-sectional view illustrating a modified seal formation;

FIGURE 3 is a partial, enlarged view showing details of construction and installation of my invention;

FIGURE 4 is a view, similar to FIGURE 3, showing further details of construction and operation; and FIGURE 5 is an exploded view showing the principal parts of the sealing structure before assembly.

With reference to the drawings, and particularly FIGURE 1, an illustrative servo-mechanism unit 10 comprises a cylinder block 12 having an inner cylinder or hollow chamber 14, port fittings 16 and 18, a piston 20 and its rod 22, and a sealing structure 24. The unit 10 may be either a master unit or a slave unit, as the case may be.

The cylinder block 12 may be of any convenient configuration and material adapted to its purpose. Port fittings 16 and 18 are provided for the ingress and egress of the actuating fluid, such as oil or liquid nitrogen. Their connecting tubes or pipes 17 and 19 are indicated in FIGURE 1. Piston 20 may be furnished with a customary sealing member 21, which may be a strip of sealing material, as shown, or may comprise one or more O-rings of suitable material for the purpose intended and compatible with the type of actuating fluid used. Piston or actuator rod 22 may be affixed to the piston in the usual manner and may be provided with a threaded portion 23 for convenient attachment to the device or system being operated.

As shown in both FIGURES 1 and 2a, sealing structure 24 comprises a seating member 26, a sealing member 28, a threaded sealing ring 30, a gland member 32, and a lock ring 34. As shown in both FIGURES 1 and 2, the open end of the cylinder 14 to be sealed is provided with an enlarged smooth bore 36 and a further enlarged threaded bore 38. Smooth bore 36 terminates in an inner shoulder 40, which is located beyond the limit of piston travel in the rightward direction.

Seating member 26 is formed with an outer diameter that closely fits in the smooth bore 36, and this member rests against the shoulder 40. Seating member 26 is provided with an inner bore 27 for receiving the shaft 22, and a spherical recess 42 into which fits the preformed sealing member 28. Sealing ring 30 may be an annular ring furnished with external and internal threads, as shown in FIGURE 2, or it may be furnished only with external threads to fit the threaded cylinder bore 38, and with a smooth inner bore 35 to fit over a portion of the gland member 32, as shown in FIGURE 1. In either case, the sealing ring 30 is threaded into the threaded cylinder bore 38 and serves to hold the sealing member 28 against the seating member 26 and to form a reliable stationary seal between the sealing structure 24 and the wall of the cylinder block 12, as more fully described hereinafter.

Gland member 32 has a spherical anvil 33, which is shaped generally to fit into the concave recess of the sealing member 28. Gland member 32 is externally threaded to screw into the sealing ring 30, as shown in FIGURES 2 and 5. Alternatively, gland member 32 may be directly threaded into the threaded cylinder bore 38, as shown in FIGURE 1, with its anvil 33 protruding through the smooth bore of the sealing ring 30. This gland member 32 may be adjusted lengthwise with relation to the seating member 26 and the sealing member 28, as will be described more fully hereinafter, and may then be locked into position with the lock nut or ring 34. The sealing ring 30, gland member 32, and lock ring 34 are provided with the customary slots or holes in the outboard surfaces so that they may be threaded into their respective threaded bores with suitable spanner wrenches.

Sealing member 28 is formed from a washer-like disc 29 of thin bimetallic sheet metal which may be approximately .032 inch in thickness and is composed of metal pairs or layers, commercially available, which are suitable for use under the extreme temperatures likely to be encountered. These bimetallic elements, which are formed of two or more layers and of different metals that have different coefficients of expansion, are also known as "thermo-responsive bimetallic elements," and "bimetallic elements," and also as "thermostatic bimetals." The bimetallic member 29 is annular, being formed with a flat external layer or part 29a (FIG. 2) and an internal layer or part 29b (FIG. 4) that is spherically shaped to operate between mating spherical parts of the seating member 26 and the gland 32, as more fully described below. The specific compositions of these bimetallic sheets that are commercially available are generally trade secrets, and the material to be used in a specific seal is selected on the basis of the operational characteristics furnished by the manufacturer. However, the general nature and construction of bimetallic sheets to provide specific characteristics are well known in the art and will therefore not be described herein. Generally speaking, the average temperature coefficient of linear expansion of the bimetallic element or thermostatic bimetal while maintained flat is so selected that the sealing member would not part from the shaft when once sealed at the temperature of operation. However, as more fully explained hereinafter, use is also made of the tendency of a bimetallic element or thermo-responsive bimetal to flex when subjected to a temperature change. In a specific seal a bimetallic disc composed of Chace 2500 was employed to form an effective seal with a cylinder block composed of cold-rolled steel and a shaft composed of M3-type steel.

After the bimetallic sheet has been cut to form a washer, the washer is then partially enclosed with a shroud 46 on one side, which may consist of silver, copper, aluminum, or other ductile metal having high heat conductivity. The shroud 46 may be a washer-like disc somewhat larger than the sealing member 28 which is placed on the expansion side of the sealing member and then formed with its periphery overlying that of the sealing member, as shown at 48 in FIGURE 2. This crimping 48 securely fastens the shroud to the sealing member.

In the initial construction and assembly of the sealing structure 24, a jig (not shown) is constructed that conforms accurately to the sizes of the cylinder 14 and its bores 36 and 38. In effect, the jig is a duplicate of the threaded end of the cylinder 12, though open at the other end. Seating member 26 and the unshaped sealing member 28 are provided with peripheries that fit closely into smooth bore 36. The two mating parts of the seating member 26 and the anvil 33 of the gland 32 are polished. Seating member 26 is provided with a spherical recess 42 of any convenient radius of curvature, say one and one-half inches. The total thickness of the bimetallic sealing member 28 may be in the nature of 0.047 inch, and the radius of curvature of the anvil may be 1.5 inches minus 0.047 inch or 1.453 inches. The parts 26, 28 and 32 are provided with bores that are slightly less than the finished diameter of the piston rod 22.

In the actual shaping of the seal member, seating member 26 is inserted into the smooth bore 36 of the jig. Then the flat bimetallic washer with its flat shroud are placed next to the seating member. The unshaped sealing member 28 is followed by sealing ring 30, which is screwed forcibly against the periphery of the sealing member. Annual projection 31, machined on the cylinder side of the sealing ring 30, abuts against the crimped edge 48 of the shroud 46 and forces the soft metal outwardly so as to form a tight outer seal between the sealing member 28 and the bore 36. This action of the sealing ring 30 with annular projection 31 also grips the outer periphery of the bimetallic disc, holding it firmly for the forming and coining action to follow.

Then, as shown in FIGURE 2, gland member 32 is threadedly inserted into and through the sealing ring 30 and is forced against the sealing member 28. The rounded anvil 33 is thus pressed forcibly against the initially flat sealing member 28 and forces it into the spherical recess 42. In conjunction with the fact that the periphery of the bimetallic disc is held firmly in place against the seating member 26, this pressing or coining action of the anvil 33 stretches the bimetallic disc, setting up radial and circular strains in the bimetallic disc, starting with the inner diameter and working outwardly. As a result, an actual expansion of the inner bore occurs. Likewise the inner bore of the aluminum shroud expands. The two bores are originally dimensioned so that ultimately the inner bore of the shroud is larger than that of the bimetallic washer.

As the shrouded washer is stretched, the inner or spherical part is stressed beyond the elastic limit of the material forming the washer permanently with a spherical inner part or dome 29b. When the forming operation is completed, residual stresses remain in the sealing member, especially in the dome, both in the shroud and in the bimetallic washer. These stresses are partially relieved when the anvil is withdrawn, causing the curvature of the dome to decrease slightly and the central opening to contract slightly.

It is to be understood that the actual forming, described above, has been with reference to the type of structure shown in FIGURE 2. The procedures and results are similar with respect to the form of structure shown in FIGURE 1; the only difference is that in FIGURE 1, gland member 32 is threaded into the main cylinder bore 38 and the anvil protrudes through the enlarged, smooth bore of the sealing ring 30.

After the sealing member has been thus shaped by squeezing between the members 26 and 32 and while still assembled under pressure, the parts 26, 28 and 32 are lapped and honed until they fit the typical rod 22 with a clearance of not more than .001 inch.

As is well known, the peculiar properties of bimetallic sheets is based on the different rates or coefficients of expansion or contraction of the two metal sheet members that are bonded, welded, or otherwise secured together. When exposed to a change in temperature, one sheet member tends to expand more than the other, causing the sheet member to flex. If the bimetallic washer is unrestrained, it becomes distorted, the spherical part 29b changing from one shape to a new shape that corresponds to the temperature. But if the bimetallic washer is restrained, stresses develop in it, the value of the stresses and their distribution depending upon the temperature. If the sealing member 28 is to be used at elevated temperatures, the side of the bimetallic washer 29 with the greater coefficient of expansion is covered by the shroud and is positioned toward the cylinder, piston, and seating member 26. Thus, as the cylinder and its operating fluid become heated, the heat travels to the right and causes the sealing member to curve downwardly toward the anvil 33 and the rod 22. Conversely, if the unit is to be used at extremely low temperatures, the side of the bimetallic washer 29 with the lesser coefficient of expansion is covered with the shroud and positioned toward the cylinder and its cold fluid. Again the low temperatures cause the sealing member to curve toward the anvil and the rod. In either event, the side of the bimetallic sheet which is to expand the more when the temperature of the washer is changed from the temperature of installation to the temperature of use is located on the seating member side. Thus, the convex side is the expansion side and the concave side is the contraction side of the sealing member.

While the forming of the seal structure 24 and the disc 29 may be accomplished, as described above, at ambient temperatures, it may also be achieved with the jig and parts being brought to the temperature at which the sealing unit is expected to operate. Where extreme temperatures are surely to be encountered, the forming should be done under such conditions.

After the parts of the sealing structure are so formed and fitted, they are then removed from the jig and installed in the cylinder in which they are to be used, with the piston or actuator rod pertaining thereto. When thus installed, gland member 32 is first seated firmly against the sealing member 28, stressing and stretching the spherical part of the washer and enlarging its central bore. The rod or shaft 22 is then inserted and assembled with the cylinder. Then the anvil is slightly withdrawn, as indicated in FIGURE 3. This slight withdrawal relieves the stress on the sealing member 28, permitting the bimetallic washer 29 to assume a state of less curvature and causing the central bore to contract onto the shaft. Then anvil 33 is positioned to act as a stop to prevent over-contraction of the sealing member when under operating conditions. It will be understood that as the anvil is withdrawn, the stress in the sealing member 28 and particularly the bimetallic washer 29 is relieved, causing the curved part to contract slightly and to be compressed against the outer surface of the rod 22, thus forming a firm seal there.

In effect, the residual stresses present in the strained bimetallic washer when initially installed cause the strained member to be forced back slightly toward its original, flat shape. In this action, the inner edge of the bimetallic washer 29 moves longitudinally outwardly of the cylinder in the direction of the rod axis, but radially inwardly towards the rod. The amount of withdrawal of the anvil is adjusted so that the anvil acts as a stop of preventing the washer 29 from binding the rod over the temperature range at which the unit is to be operated. In some cases the amount of withdrawal is adjusted to the point where an imperfect seal is formed at the ambient temperature, but a reliable seal is formed throughout the operating range of temperatures. After the anvil has been backed off the proper amount, the lock ring 24 or 34, as the case may be, is tightened. Thus, a seal is formed which will not prevent movement of the rod relative to the cylinder block under operating conditions. Also, backing off the anvil 33, that is to the right as viewed in the drawing, may be used to adjust for wear at the central opening of the sealing member 28.

To illustrate the action of the unit, consider a case in which a sealing member has been formed that is to be operated at elevated temperatures but which initially does form a high pressure seal about the rod 22 at ambient temperatures. In such a case, as the temperature of the fluid in the cylinder increases, all parts of the unit absorb heat and tend to expand with relation to their respective sizes, forms and coefficients of expansion. The sealing member shroud 46, being selected of material having high heat conductivity, assists in transmitting the heat rapidly and uniformly to the bimetallic disc 29 of the sealing member 28. As the temperature of the bimetallic disc increases, the spherical part tends to bend outwardly of the cylinder and toward the shaft. As a result its inner diameter or bore contracts until the inner edge grips or closes gently upon the shaft, thus establishing an effective seal to prevent the escape of the working fluid.

In this form of the invention the position of the anvil is so adjusted that the washer contacts against the anvil 33 when the temperature rises shortly after the inception of the gripping and sealing action of the washer about the rod 22. The action is portrayed in FIGURE 4, where the bimetallic disc 29 is shown closely engaging the shaft 22 and the anvil 33. It will be noted here that the domed part of the bimetallic disc 29 is parted from the domed part of the aluminum shroud. This separation occurs because of the flexing force caused by the temperature change. In some cases the domed part of the shroud may also be parted somewhat from the seating member 26 because of the stresses created in the shroud during the forming of the sealing member. In this condition the outer zone of the dome 29b presses against the seating member 26 as at A, and the inner zone of the dome presses against the anvil 33 as at B, forming gaps 40 and 41 respectively, opposite the points A and B but on the other side of the bimetallic member. Thereafter, as the temperature is raised, further longitudinal bending of the washer along the axis is prevented by the anvil. However, the stresses generated in the bimetallic washer by the further rise in temperature, cause the intermediate zone of the dome to tend to straighten toward a conical shape, thus forcing the inner part of the washer to compress with increasing force about the rod, thus assuring a good seal over a wide temperature range.

It should be noted here that the contraction of the inner bore or diameter of the bimetallic disc 29, as mentioned above, is due to several factors, among them the following:

(1) The residual stresses initially set up in the disc during its forming in the jig;

(2) The fact that the outer part of the seal is firmly held in place due to its close fit into the shroud 46 and the cylinder bore 36, and the forceful clamping effect of the sealing ring 30;

(3) The flexing of the disc toward the anvil and the shaft;

(4) The coning effect of further increase in temperature; and (5) The application of a flexing force in the disc toward the anvil and the shaft as the temperature is changed or pressure is applied.

The sealing ring 30 not only holds the sealing member 28 against the seating member 26, but also forces the peripheral metal of the shroud outwardly, thus forming a stationary crush seal which is impermeable for all practical purposes. Thus, the general or overall expansion or contraction of the disc relative to the cylinder block as the temperature changes, is largely inhibited if not completely prevented. Simultaneously, the inner spherical part of the bimetallic washer tends to bend or flex toward its original flat position and to cone. These effects cooperate to oppose the formation of any gap between the sealing member and the shaft, thus forming a seal that remains effective even at extreme elevated temperatures.

As set forth above, the anvil 33 serves as a stop to prevent free bending of the dome. In this way excessive contraction is effectively prevented. For this reason, the disc is prevented from actually seizing the shaft and interfering with the sliding movement of the shaft into and out of the cylinder.

Conversely, when the conditions involve extremely cold fluids and high pressures, the reversed bimetallic disc which is used acts in a similar manner to that described above. In this case, heat is transmitted away from the bimetallic disc by the shroud 46. The metal on the anvil side of the disc contracts more than the other metal of the disc. Consequently, the disc curves toward the shaft and the anvil and its inner diameter contracts as explained above. Thus, a seal is formed that is effective as the temperature is lowered.

When extremely high pressures are applied to the piston by means of the heated fluid, the initial natural heat-induced curvature of the disc 29 is aided by the increased pressure to effect the automatically improved seal.

In the embodiments of the invention described above, the assumption is made that the sealing structure is to be used only at a temperature that differs widely from standard or room temperature. However, the invention may also be incorporated in a seal that is to be used over a wide temperature range which overlaps standard, or atmospheric, or room temperature. Thus, for example, to provide a seal which is to operate from $-100°$ F. to $+500°$ F., a sealing washer having characteristics like that first described above may be employed. In this case, however, the seal is formed in a jig, at a temperature below $-100°$ F., and after installation of the seal in a cylinder, the anvil is backed up to form a seal at a temperature below $-100°$ F. In this case, the sealing action is established at a temperature below $-100°$ F., and as the temperature of the unit rises above this point, the sealing pressure of the bimetallic washer on the rod increases, thereby improving the effectiveness of the seal at such higher temperatures. Conversely, the second type of sealing washer may be employed and can be formed and installed at a temperature above +500° F., thus providing a structure in which the sealing pressure increases as the temperature is decreased.

From the foregoing description and explanation, it will now be apparent that I have provided an improved sealing structure which can be employed to provide efficient and reliable seals under extreme conditions of temperature and pressure, and more particularly, that I have provided a sealing structure which responds to a change in temperature, or to an increase in pressure, or to both, in such a way as to make the seal more effective and reliable under such conditions, without, however, preventing the relative movement of the two parts between which the seal is installed.

Though my invention has been described above only with reference to two specific forms of sealing structures, it will be understood that the invention may be employed in many other forms. Furthermore, the invention may be applied to other types of units, such as valves that have stems projecting through casings, centrifugal pumps that have rotating shafts that project through their housings, double-ended hydraulic actuators, expansion joints, and other types of devices in which a shaft passes through a wall into a chamber containing a pressurized fluid. It will therefore be understood that the invention is not limited in application to a single-ended hydraulic actuator as described, but may be applied to many other devices. Furthermore, even though only certain methods of shaping the bimetallic washer have been described, it will be understood that the washer may be formed in other ways. Furthermore, the exact procedure for installing and adjusting the sealing unit may be varied in a wide number of ways. It will also be understood that the sealing structure may be embodied in many other forms, that the parts may be composed of different materials, and different shapes and sizes than described herein without departing from the principles of the invention. It is therefore to be understood that the invention is not restricted to the specific embodiments described herein, but may be embodied in many different forms, as will now occur to those skilled in the art, within the scope of the appended claim.

I claim:

In combination with a chamber formed by a wall member having an opening through which a circular shaft extends, said chamber being adapted to contain pressurized fluid liable to leak through said opening past said wall member and said shaft when subjected to a temperature change in a predetermined direction; a sealing structure mounted in said opening between said wall member and said shaft for reducing said leakage, said sealing structure comprising an annular thermo-responsive bimetallic element, means for forming a tight stationary seal between the outer edge of said annular element and said wall member, the inner part of said annular element encircling said shaft closely and projecting toward the interior of said chamber, said inner part engaging said shaft and being adapted to apply a flexing force toward said shaft in response to such temperature change, whereby said element sealingly engages said shaft without preventing relative movement between said element and said shaft member; said opening being provided with an internal shoulder extending from a smooth bore and a larger threaded bore concentric with said smooth bore and said shoulder and wherein said sealing structure comprises:

a centrally recessed seating member adapted to fit into the smooth bore of said opening against said shoulder, the dome of said metallic sealing disc member fitting into said recess;

means including a sealing ring threadedly inserted into said threaded bore of said opening and adapted for creating an impermeable seal between the walls of said chamber and the outer periphery of said sealing member; and a glandular member threadedly inserted in said threaded bore of said opening, said glandular member having an anvil of reduced diameter protruding inwardly through said sealing ring and into the concave part of said dome for limiting the movement of said dome outwardly of said chamber and toward said shaft.

References Cited in the file of this patent

UNITED STATES PATENTS

| 490,773 | Osborne | Jan. 31, 1893 |
| 637,098 | Endruweit | Nov. 14, 1899 |
| 974,823 | Power | Nov. 8, 1910 |
| 1,009,787 | Power | Nov. 28, 1911 |
| 1,437,234 | Fraser | Nov. 28, 1922 |
| 2,350,123 | Mercier | May 30, 1944 |
| 2,404,664 | Skinner | July 23, 1946 |
| 2,502,290 | Szitar | Mar. 28, 1950 |
| 2,690,939 | Whaley | Oct. 5, 1954 |

FOREIGN PATENTS

| 148,184 | Sweden | Dec. 21, 1954 |
| 363,377 | Italy | Oct. 4, 1938 |